(12) United States Patent
Matulewicz et al.

(10) Patent No.: US 8,535,567 B2
(45) Date of Patent: *Sep. 17, 2013

(54) CORROSION INHIBITOR COMPOSITIONS COMPRISING TETRAHYDROBENZOTRIAZOLES SOLUBILIZED IN ACTIVATING SOLVENTS AND METHODS FOR USING SAME

(75) Inventors: William N. Matulewicz, West Chester, OH (US); Peter F. Vogt, Loveland, OH (US); James N. Milawski, Maineville, OH (US)

(73) Assignee: Wincom, Inc., Blue Ash, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,845

(22) Filed: Aug. 3, 2012

(65) Prior Publication Data

US 2012/0313048 A1 Dec. 13, 2012

Related U.S. Application Data

(63) Continuation of application No. 13/045,580, filed on Mar. 11, 2011, now Pat. No. 8,236,204.

(51) Int. Cl.
C09K 3/00 (2006.01)
C23F 11/00 (2006.01)
C04B 9/02 (2006.01)

(52) U.S. Cl.
USPC ............... 252/390; 106/14.05; 106/14.16; 210/696; 210/698; 252/392; 252/394; 422/14; 422/16

(58) Field of Classification Search
USPC ............... 106/14.05, 14.16; 210/696, 698; 252/390, 392, 394; 422/14, 16
See application file for complete search history.

(56) References Cited

U.S. PATENT DOCUMENTS

| | | |
|---|---|---|
| 3,537,999 A | 11/1970 | Kennedy |
| 3,597,353 A | 8/1971 | Randell et al. |
| 3,833,502 A | 9/1974 | Leary et al. |
| 3,849,433 A | 11/1974 | Butula et al. |
| 4,060,491 A | 11/1977 | Bridger et al. |
| 4,066,821 A | 1/1978 | Cook et al. |
| 4,144,188 A | 3/1979 | Sato |
| 4,315,889 A | 2/1982 | McChesney et al. |
| 4,406,811 A | 9/1983 | Christensen et al. |
| 4,675,158 A | 6/1987 | Klindera |
| 4,701,273 A | 10/1987 | Brady et al. |
| 4,734,209 A | 3/1988 | Philips et al. |
| 4,744,950 A | 5/1988 | Hollander |
| 4,898,687 A | 2/1990 | Parker et al. |
| 4,959,161 A | 9/1990 | Clubley |
| 4,976,919 A | 12/1990 | Skold et al. |
| 5,013,482 A | 5/1991 | O'Neil |
| 5,055,230 A | 10/1991 | Clubley et al. |
| 5,091,113 A | 2/1992 | Clubley |
| 5,126,397 A | 6/1992 | Horodysky et al. |
| 5,171,463 A | 12/1992 | O'Neil |
| 5,217,686 A | 6/1993 | Vanderpool et al. |
| 5,219,523 A | 6/1993 | Vanderpool et al. |
| 5,236,626 A | 8/1993 | Vanderpool et al. |
| 5,378,373 A | 1/1995 | Holander |
| 5,482,521 A | 1/1996 | Avery et al. |
| 5,490,946 A | 2/1996 | Beltzer et al. |
| 5,578,556 A | 11/1996 | Farng et al. |
| 5,580,482 A | 12/1996 | Chasan et al. |
| 5,597,514 A | 1/1997 | Miksic et al. |
| 5,622,922 A | 4/1997 | Clarke et al. |
| 5,723,061 A | 3/1998 | Ciardi et al. |
| 5,746,947 A | 5/1998 | Vanderpool et al. |
| 5,750,053 A | 5/1998 | Miksic et al. |
| 5,773,627 A | 6/1998 | Anderson et al. |
| 5,874,026 A * | 2/1999 | Pilsits et al. ............... 252/394 |
| 5,874,390 A | 2/1999 | Gong et al. |
| 5,922,978 A | 7/1999 | Carroll |
| 5,958,849 A | 9/1999 | Hewson et al. |
| 6,074,992 A | 6/2000 | Levesque |
| 6,448,207 B1 | 9/2002 | Fukutani et al. |
| 6,448,749 B2 | 9/2002 | Pochmuller |
| 6,551,552 B1 | 4/2003 | Lyublinski et al. |
| 6,585,933 B1 | 7/2003 | Ehrhardt et al. |
| 6,706,670 B2 | 3/2004 | Kalota et al. |
| 6,716,281 B2 | 4/2004 | Bernards et al. |

(Continued)

FOREIGN PATENT DOCUMENTS

| | | |
|---|---|---|
| DE | 1948794 | 4/1971 |
| GB | 1331606 | 9/1973 |

(Continued)

OTHER PUBLICATIONS

Cobratec 911S Specification (Mar. 23, 1999).

(Continued)

Primary Examiner — Bijan Ahvazi
(74) Attorney, Agent, or Firm — Eric W. Guttag; Eric W. Guttag IP Law Office

(57) ABSTRACT

A composition with one or more tetrahydrobenzotriazoles and one or more one or more tetrahydrobenzotriazole activating solvents, wherein the tetrahydrobenzotriazoles are solubilized in the activating solvents in an amount effective to inhibit corrosion of a metal or metal alloy which is corrodible in the presence of copper or copper corroding agents. Also, a method of using this composition to inhibit corrosion of a metal component which has a metal or metal alloy which is corrodible in the presence of copper or copper corroding agents.

7 Claims, 1 Drawing Sheet

(56) References Cited

U.S. PATENT DOCUMENTS

| | | |
|---|---|---|
| 6,946,027 B2 | 9/2005 | Bernards et al. |
| 6,984,340 B1 | 1/2006 | Brady et al. |
| 7,108,795 B2 | 9/2006 | Bernards et al. |
| 7,186,354 B2 | 3/2007 | Aoki et al. |
| 7,291,581 B2 | 11/2007 | Levine et al. |
| 7,393,395 B2 | 7/2008 | Aiba et al. |
| 8,236,204 B1 * | 8/2012 | Matulewicz et al. ......... 252/390 |
| 8,236,205 B1 * | 8/2012 | Matulewicz et al. ......... 252/390 |
| 2001/0030315 A1 | 10/2001 | Aoki et al. |
| 2003/0063998 A1 | 4/2003 | Ghosh et al. |
| 2003/0063999 A1 | 4/2003 | Ghosh et al. |
| 2003/0065116 A1 | 4/2003 | Ghosh et al. |
| 2003/0127624 A1 | 7/2003 | Mizutani et al. |
| 2004/0235681 A1 | 11/2004 | Levine et al. |
| 2005/0020457 A1 | 1/2005 | Rohrbach et al. |
| 2005/0238811 A1 | 10/2005 | Bernards et al. |
| 2006/0019840 A1 | 1/2006 | Kawahara et al. |
| 2007/0191240 A1 | 8/2007 | Suda |
| 2009/0281017 A1 | 11/2009 | Suzuki et al. |
| 2010/0022424 A1 | 1/2010 | Vogt et al. |
| 2010/0022425 A1 | 1/2010 | Michel et al. |
| 2010/0137174 A1 | 6/2010 | Maeda et al. |

FOREIGN PATENT DOCUMENTS

| | | |
|---|---|---|
| GB | 1518342 | 7/1974 |
| WO | WO 0066810 | 11/2000 |
| WO | WO 02102945 | 12/2002 |
| WO | WO 03004476 | 1/2003 |
| WO | WO 03044140 | 5/2003 |
| WO | WO 03057317 | 7/2003 |
| WO | WO 2004015043 | 2/2004 |
| WO | WO 2004050671 | 6/2004 |
| WO | WO 2004104146 | 12/2004 |
| WO | WO 2005097728 | 10/2005 |
| WO | WO 2006018403 | 2/2006 |
| WO | WO 2006029966 | 3/2006 |
| WO | WO 2006053858 | 5/2006 |
| WO | WO 2007135017 | 11/2007 |
| WO | WO 2008015116 | 2/2008 |
| WO | WO 2008055797 | 5/2008 |
| WO | WO 2009134716 | 11/2009 |
| WO | WO 2010008694 | 1/2010 |

OTHER PUBLICATIONS

Cobratec 928 Specification, Multi-Metal corrosion Inhibitor, pp. 1-2 (Sep. 9, 1998).

Cobratec Corrosion Inhibitors, Cobratec 928 Specification, Multi-Metal corrosion Inhibitor, pp. 1-2 (Sep. 13, 1995).

Wintrol HT90 (90%) Tetrahydro tolyltriazole, Determination of General Physico-Chemical Properties, pp. 1-32 (Apr. 26, 2000).

Wells, "Commercial Triazoles and Their Properties," AWT Meeting in Palm Springs, Sep. 21-24, 2005, AWT Journal of Spring 2007, vol. 14, No. 2, pp. 24-35.

* cited by examiner

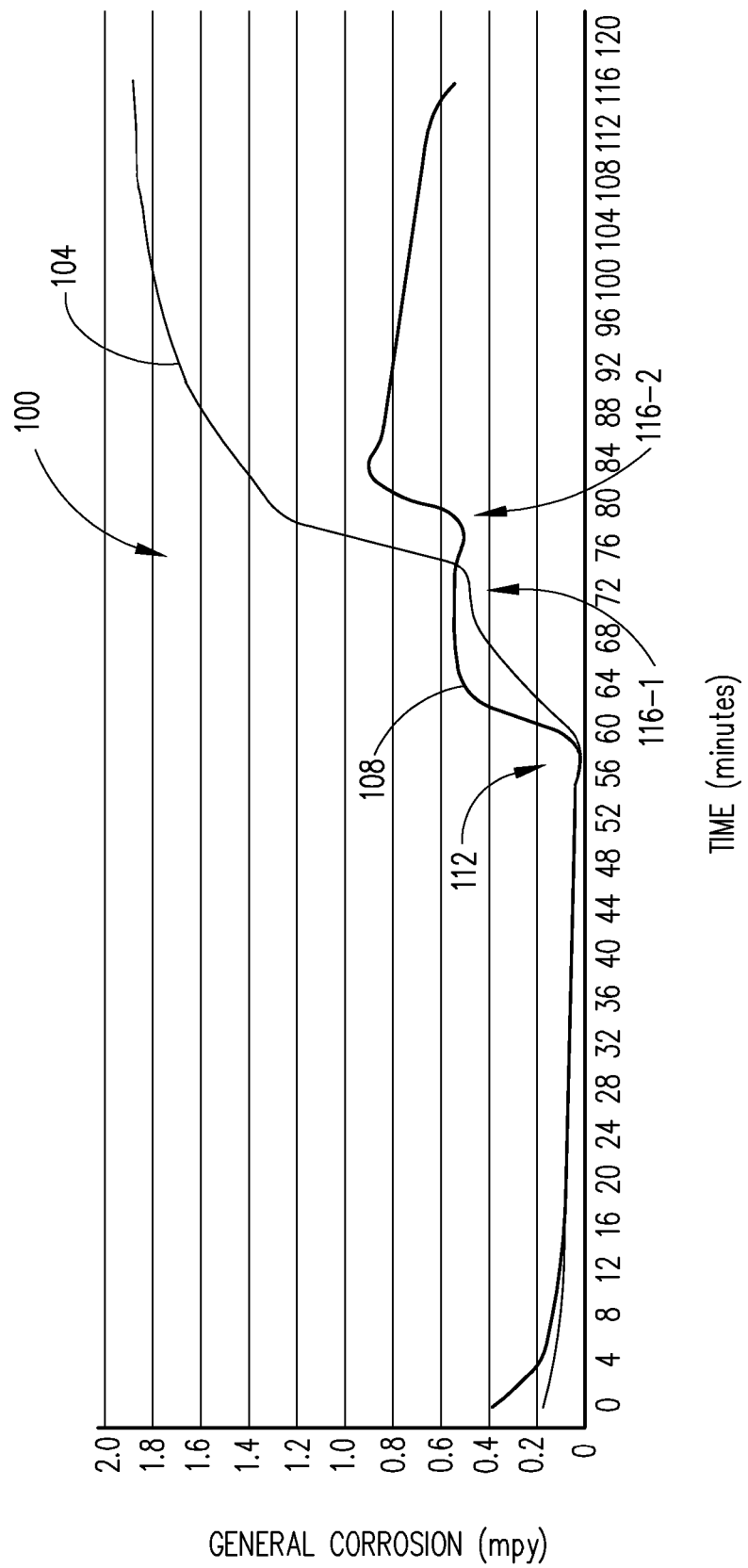

CORROSION INHIBITOR COMPOSITIONS COMPRISING TETRAHYDROBENZOTRIAZOLES SOLUBILIZED IN ACTIVATING SOLVENTS AND METHODS FOR USING SAME

CROSS-REFERENCE TO RELATED APPLICATIONS

This application is a continuation of U.S. application Ser. No. 13/045,580 filed Mar. 11, 2011 now U.S. Pat. No. 8,236,204. The entire disclosure and contents of the above referenced application is hereby incorporated by reference.

FIELD OF THE INVENTION

The present invention generally relates to a corrosion inhibiting composition comprising one or more aliphatic-substituted tetrahydrobenzotriazoles solubilized in one or more tetrahydrobenzotriazole activating solvents. The present invention also generally relates to a method for inhibiting corrosion of a metal component which is corrodible in the presence of copper or copper corroding agents by contacting that metal component with a corrosion inhibiting amount of this composition.

BACKGROUND

In many industrial processes, undesirable excess heat may be removed by the use of heat exchangers in which aqueous systems may be used as the heat exchange fluid. Various metals and metal alloys, such as copper and copper-bearing alloys (e.g., brass), may be used in the fabrication of such heat exchangers, as well as in other parts in contact with the cooling water, such as pump impellers, stators, valve parts, etc. Aqueous systems such as those cooling fluids may be corrosive towards these copper-containing metal parts due to the presence of aggressive ions and by the intentional introduction of oxidizing substances for biological control. The consequences of such corrosion are the loss of metal from the equipment, potentially leading to failure or requiring expensive maintenance, creation of insoluble corrosion product films on the heat exchange surfaces, potentially leading to decreased heat transfer and subsequent loss of productivity, and discharge of copper ions which may then "plate out" on less noble metal surfaces and may cause severe galvanic corrosion, a particularly insidious form of corrosion. Also, copper is a potentially toxic substance, so its discharge to the environment is undesirable.

It is common practice to introduce corrosion inhibitors into such cooling water systems, as well as other aqueous and nonaqueous systems. These corrosion inhibitors may interact with the metal/metal alloy to directly produce a film which is resistant to corrosion, or may indirectly promote formation of protective films by activating the metal/metal alloy surface so as to form stable oxides, other insoluble salts, etc. Such protective films may not be completely stable, but may instead degrade under the influence of the aggressive conditions in the cooling water. Because of this degradation, a constant supply of corrosion inhibiting substances in the cooling water may be required to inhibit corrosion of the metal/metal alloy surface.

In general, the corrosion inhibiting performance of these corrosion inhibitors in industrial water systems (as well as in other systems, for example, other heat transfer systems, lubricant systems, hydraulic fluid systems, etc.) may be judged by their passivation and persistency characteristics. Improved film persistence is recognized as one of the criteria for film-forming corrosion inhibitors in view of the economic and ecologic advantages of the commensurate low dose or charge required for corrosion inhibiting compositions that may attain such persistence. Passivation rate is also a relevant criterion for the same reasons. In other words, those compositions that provide the most valuable corrosion inhibiting films are those which both form quickly, thus minimizing the presence of the corrosion inhibiting composition in the effluent, as well as persist for greatest length of time, likewise minimizing the need to continually charge the corrosion inhibiting composition into the system.

SUMMARY

According to a first broad aspect of the present invention, there is provided a composition comprising:
one or more tetrahydrobenzotriazoles having the general formulas Ia or Ib:

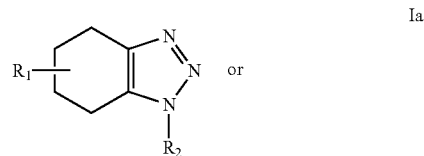

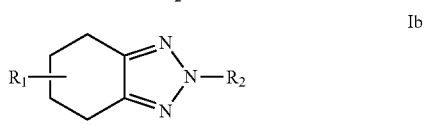

wherein $R_1$ is one or more of: H, a hydroxy group, or an aliphatic group; and wherein $R_2$ is H, or an aliphatic group; or salts of the tetrahydrobenzotriazoles; and
one or more tetrahydrobenzotriazole activating solvents, wherein the tetrahydrobenzotriazoles are solubilized in the activating solvents in an amount effective to inhibit corrosion of a metal or metal alloy which is corrodible in the presence of copper or copper corroding agents.

According to a second broad aspect of the present invention, there is provided a method comprising the following steps:
(a) providing a composition comprising:
one or more tetrahydrobenzotriazoles having the general formulas Ia or Ib:

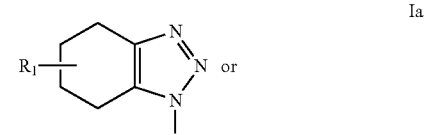

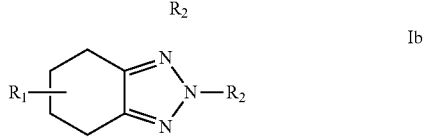

wherein $R_1$ is one or more of H, a hydroxy group, or an aliphatic group; and wherein $R_2$ is H, or an aliphatic group; or salts of the tetrahydrobenzotriazoles; and
one or more tetrahydrobenzotriazole activating solvents;

wherein the tetrahydrobenzotriazoles are solubilized in the activating solvents in an amount effective to inhibit corrosion of a metal or metal alloy which is corrodible in the presence of copper or copper corroding agents; and (b) contacting a metal component which comprises a metal or metal alloy which is corrodible in the presence of copper or copper corroding agents with a corrosion inhibiting amount of the composition of step (a) to inhibit corrosion of the metal component by the copper or copper corroding agents.

BRIEF DESCRIPTION OF THE DRAWING

The invention will be described in conjunction with the accompanying drawings, in which:

The FIGURE represents a continuous graphical plot comparing the General Corrosion rates (at 25° C.), as measured by copper electrodes, reflected in units of milli-inches per year (mpy), in the presence of two sequentially added aliquots of 5 ppm sodium hypochlorite, wherein the copper (Cu) electrodes are "passivated" with (i.e., coated with a film of) two solutions, each comprising 2 ppm tetrahydrotolyltriazole (THTT), but which are dissolved/dispersed in either water as the solvent, or propylene glycol as the solvent.

DETAILED DESCRIPTION

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "comprising" means various compositions, compounds, ingredients, components, elements, capabilities and/or steps, etc., may be conjointly employed in the present invention. Accordingly, the term "comprising" encompasses the more restrictive terms "consisting essentially of" and "consisting of."

For the purposes of the present invention, the term "tetrahydrobenzotriazoles" (referred to interchangeably herein as "tetrahydrogenated benzotriazoles" or "THBs") refers to one or more compounds having the general formulas Ia or Ib:

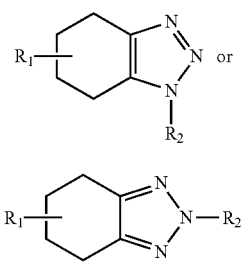

wherein $R_1$ is one or more of: H, a hydroxy group, or an aliphatic group; and wherein $R_2$ is H, or an aliphatic group; as well as salts of these compounds of formulas Ia or Ib. The aliphatic $R_1$ groups may be at one or more of the 4, 5, 6 and/or 7 positions on the cyclohexane ring. In the some embodiments, $R_1$ may be one aliphatic group, with the remaining $R_1$ being H. The salts of these tetrahydrobenzotriazoles may include, for example, the sodium salts, the potassium salts, the ammonium salts, etc. These tetrahydrobenzotriazoles may include, for example, tetrahydrobenzotriazole (i.e., 4,5,6,7-tetrahydro-benzotriazole, also referred herein interchangeably as "THBT"), tetrahydrotolyltriazole (referred to herein interchangeably as tetrahydrotolyltriazole or "THTT") which may be 4-methyl-1H-benzotriazole, 5-methyl-1H-benzotriazole, or a mixture thereof; sodium, potassium, or ammonium salts of THBT or THTT; etc., as well as blends, mixtures, etc., of these tetrahydrobenzotriazoles. See, for example, U.S. Pat. No. 3,597,353 (Randell et al.), issued Aug. 3, 1971; and U.S. Pat. No. 3,849,433 (Butula et al.), issued Nov. 19, 1974, the entire contents and disclosures of which are herein incorporated by reference, for how to prepare tetrahydrobenzotriazoles from the respective benzotriazoles by catalytic hydrogenation, and which may also provide residual unhydrogenated benzotriazoles as the other triazoles for embodiments of compositions of the present invention.

For the purposes of the present invention, the term "other triazoles" refers to one or more compounds having the general formula II:

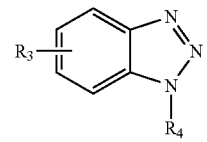

wherein $R_3$ is one or more of H, a hydroxy group, an aliphatic group, or an aromatic group, $R_4$ is H, or an aliphatic group; as well as salts of these compounds of formula II (e.g., sodium salts, potassium salts, ammonium salts, etc.). The one or more $R_3$ groups may be at one or more of the 4, 5, 6 and/or 7 positions on the benzene ring. In the some embodiments, $R_3$ may be one aliphatic group, with the remaining $R_3$ being H. These other triazoles may include benzotriazole (referred to herein interchangeably as "BT"), tolyltriazole (referred to herein interchangeably as toluyltriazole or "TT") which may be 4-methyl-benzotriazole (referred to herein interchangeably as "4-MeBT"); 5-methyl-benzotriazole (referred to herein interchangeably as "5-MeBT"), or a mixture thereof; butyl-benzotriazole (referred to herein interchangeably as "BBT") which may be, for example, 4-butyl-benzotriazole, 5-butyl-benzotriazole, or a mixture thereof; pentoxy-benzotriazole (referred to herein interchangeably as "Pentoxy BT") which may be 4-pentoxy-benzotriazole (referred to herein interchangeably as "4-Pentoxy BT"), 5-pentoxy-benzotriazole (referred to herein interchangeably as "5-Pentoxy BT"), or a mixture thereof; carboxy-benzotriazole (referred to herein interchangeably as "Carboxy BT") which may be 4-carboxy-benzotriazole (referred to herein interchangeably as "4-Carboxy BT"), 5-carboxy-benzotriazole (referred to herein interchangeably as "5-Carboxy BT"), or a mixture thereof as either the acid(s) or a water-soluble salt(s) thereof (e.g., sodium salt, potassium salt, etc.); N-1-bis(2-ethylhexyl)-aminomethyl-tolyltriazole (e.g., sold by Ciba Specialty Chemicals under the trade name Irgamet 39®); N-1-bis(2,2'-ethanol)-aminomethyl-tolyltriazole (e.g., sold by Ciba Specialty Chemicals under the trade name Irgamet 42®); sodium, potassium, or ammonium salts of, for example, TT, BT, or BBT; etc.

For the purposes of the present invention, the term "aliphatic" refers to a carbon-containing moiety other than an aromatic moiety. Aliphatic moieties may be straight chain, branched chain, cyclic (cycloaliphatic), or any combination thereof, may be substituted or unsubstituted, may include one or more heteroatoms (e.g., oxygen atoms, nitrogen atoms, sulfur atoms, etc.) in the carbon chain (i.e., may be heterocyclic), may be unsaturated (i.e., one, two or more double bonds) or saturated, etc, and may have any desired number of carbon atoms, e.g., from 1 to 30 carbon atoms, for example from 1 to 12 carbon atoms, such as from 1 to 7 carbon atoms, (e.g., from 1 to 4 carbon atoms), etc. Aliphatic moieties suitable herein may include, but are not limited to, substituted or unsubstituted alkyl, alkenyl, alkadienyl, alkynyl, cycloalkyl, cycloalkenyl, etc. Suitable aliphatic moieties may include, but are not limited to, straight or branched chain alkyl (e.g., methyl, ethyl, propyl, isopropyl, butyl, isobutyl, pentyl, hexyl, heptyl, etc.) and substituted alkyl (e.g., hydroxylmethyl, hydroxyethyl, trifluoromethyl, alkoxymethyl, etc.), alkoxy, substituted amino (e.g., dimethylamino, etc.), carboxy, ester, amide, sulfonamide, carbamate, acyl (i.e., aldehyde or keto), etc., or any combination thereof.

For the purposes of the present invention, the term "aromatic" refers to an unsaturated cyclic arene moiety containing one or more unsaturated cyclic rings (for example, 5 and/or 6 atoms per ring) that may be substituted, unsubstituted, or a combination thereof, may be heterocyclic (i.e., including one or more oxygen atoms, nitrogen atoms, sulfur atoms, etc.), nonheterocyclic, or a combination thereof, may have any desired number of carbon atoms, e.g., from 3 to 30 carbon atoms, for example, from 3 to 18 carbon atoms, e.g., from 3 to 12 carbon atoms, etc. Aromatic moieties suitable herein may include, but are not limited to, substituted or unsubstituted phenyl, naphthyl, biphenyl, binaphthyl, phenanthenryl, anthracenyl, pyridinyl, pyrimidinyl, purinyl, pyrinyl, furanyl, thiophenyl, benzofuranyl, benzothiophenyl, dibenzofuranyl, dibenzothiophenyl, imidazolyl, oxazolyl, thiazolyl, pyrazolinyl, indolyl, pyridazinyl, pyrazinyl, quinolinyl, isoquinolinyl, benzoquinolinyl, phenanthrolinyl (e.g., 1,10-phenanthrolyl), carbazolyl, etc. Suitable aromatic moieties may include, but are not limited to, aromatics substituted with straight or branched chain alkyl (e.g., methyl, ethyl, propyl, isopropyl, butyl, isobutyl, pentyl, hexyl, heptyl, etc.) and substituted alkyl (e.g., hydroxymethyl, hydroxyethyl, trifluoromethyl, alkoxymethyl, etc.), amino and substituted amino (e.g., dimethylamino, etc.), hydroxy (e.g., a phenolic), carboxy, sulfonate, ester, amide, sulfonamide, carbamate, acyl (i.e., aldehyde or ketone), nitro, etc., or any combination thereof.

For the purposes of the present invention, the term "tetrahydrobenzotriazole activating solvents" refers to those solvents which enhance, improve, reduce the variability of, etc., the corrosion inhibiting ability, effectiveness, etc., of tetrahydrobenzotriazoles. These tetrahydrobenzotriazole activating solvents are generally polar and are capable of solubilizing the tetrahydrobenzotriazoles, as well as other triazoles. These tetrahydrobenzotriazole activating solvents may include one or more of the following: aliphatic alcohols having, for example, from 1 to 6 carbon atoms, such as methanol, ethanol, propanol, isopropanol, butanol, isobutanol, pentanol, isopentanol, hexanol, isohexanol, etc.; low-molecular weight hydroxyl-containing polyol compounds, such as propylene glycol (1,2-propylene glycol and/or 1,3-propylene glycol), ethylene diglycol, diethylene glycol, triethylene glycol, dipropylene glycol, butylene glycol, butyl diethylene glycol, glycerol, etc.; monoethers of glycols such as methyl, ethyl, propyl and/or butyl monoethers of ethylene glycol, diethylene glycol, propylene glycol, dipropylene glycol, etc.; higher molecular weight nonionic alkylene oxide polyol adduct(s) having a molecular weight of more than about 400, such as, for example, polyethylene glycol, polypropylene glycol, random-added polypropylene polyethylene glycols, or block copolymers of ethylene and propylene oxide sometimes referred to as poloxamers (e.g., Pluronics®); etc.

For the purposes of the present invention, the term "metal component" refers to any part, piece, tool, machine, etc., which comprises one or more metals or metal alloys. Metal components may include heat exchangers, pumps, pump impellers, stators, valve parts, evaporators, boilers, metal working tools, containers, drums, barrels, pipe, ducts, drums, cylinders, conduits, plumbing, etc.

For the purposes of the present invention, the term "metal or metal alloy which is corrodible in the presence of copper or copper corroding agents" refers to a metal or metal alloy which, when in contact with, exposed to, etc., copper (e.g., copper ions) or a copper corroding agent, may lose at least a portion of the metal or metal alloy due to a chemical or an electrochemical corrosive process. In the case of metals or metal alloys which include one or more of aluminum, steel, iron, (e.g., cast iron), silver, etc., which may corrode in the presence of copper, the corrosive process is primarily electrochemical where, for example, copper ions "plate out" from an electrolytic solution onto the metal or metal alloy and thus cause "galvanic corrosion." In the case of metals or metal alloys such as copper, brass, bronze, etc., which corrode in the presence of a copper corroding agent (e.g., hypochlorite), the corrosive process is primarily chemical where, for example, copper is dissolved from the surface of the metal component, and forms copper ions in the fluid in contact with the metal component surface.

For the purposes of the present invention, the term "galvanic corrosion" refers conventionally to an electrochemical process in which one metal corrodes preferentially when in electrical contact with a different type of metal, and wherein both metals are immersed in, in contact with, in the presence of, etc., an electrolyte-containing fluid.

For the purposes of the present invention, the term "corrosion inhibitor" refers to a material, substance, composition, compound, component, etc., which reduces, decreases, diminishes, lowers, minimizes, etc., the rate of corrosion (e.g., General Corrosion rate) of a metal or metal alloy from the surface of a metal component in the presence of copper or a copper corroding agent.

For the purposes of the present invention, the term "corrosion inhibiting amount" refers to an amount of a material, substance, composition, compound, component, etc., which is effective to provide a measurable degree of reduction, diminution, drop, decrease, etc., in the rate of corrosion (e.g., General Corrosion) of metal or metal alloy from the surface of a metal component in the presence of copper or a copper corroding agent.

For the purposes of the present invention, the term "aqueous system" refers to any system containing metals which contain or are in contact with aqueous fluids on a regular basis. Aqueous systems may include open recirculating cooling systems which obtain their source of cooling by evaporation, closed loop cooling systems, boilers and similar steam generating systems, heat exchange equipment, reverse osmosis equipment, oil production systems, flash evaporators, desalinization plants, gas scrubbers, blast furnaces, paper and pulp processing equipment, steam power plants, geothermal systems, food and beverage processing equipment, sugar evaporators, mining circuits, bottle washing equipment, soil irrigation systems, closed circuit heating systems for residential and commercial use, aqueous-based refrigeration systems, down-well systems, aqueous machining fluids (e.g., for use in boring, milling, reaming, broaching, drawing, turning, cutting, sewing, grinding and in thread-cutting operations, or in non-cutting shaping, spinning, drawing, or rolling operations), aqueous scouring systems, aqueous glycol anti-freeze systems, water/glycol hydraulic fluids, ferrous-surface pre-treatment, polymer coating systems, etc. These aqueous systems may include various sources of water, for example, fresh water, brackish water, sea water, brines, sewage effluents, industrial waste waters, etc.

For the purposes of the present invention, the term "oxidants" refers to materials, substances, compositions, compounds, etc., which are present in or added to for example, aqueous systems to oxidize other components present in these systems, for example, are used as biocides for aqueous systems. These oxidants may include, for example, chlorine-containing oxidants, such as, for example, chlorine, chlorine dioxide, sodium chlorite, hypochlorous acid, hypochlorites (e.g., sodium hypochlorite, calcium hypochlorite, etc.), chlorine bleach, etc., nonchlorine-containing oxidants such as acids (e.g., sulfuric acid, nitric acid, etc.), caustics (e.g., sodium hydroxide, potassium hydroxide, etc.), nonchlorine bleach, peroxides (e.g., hydrogen peroxide, sodium peroxide, etc.), ozone, etc.

For the purposes of the present invention, the term "copper corroding agent" refers to materials, substances, compositions, compounds, etc., which causes, increases, etc., loss of copper (including copper present in copper alloys such as brass, bronze, etc.) from the surface of metal components. These copper corroding agents may include, for example, chlorine-containing oxidants such as chlorine; chlorine dioxide, sodium chlorite, hypochlorous acid, hypochlorites (e.g., sodium hypochlorite, calcium hypochlorite, etc.), chlorine bleach, etc., as wells nonchlorine-containing oxidants such as acids (e.g., sulfuric acid, nitric acid, etc.), caustics (e.g., sodium hydroxide, potassium hydroxide, etc.), nonchlorine bleach, peroxides (e.g., hydrogen peroxide, sodium peroxide, etc.), ozone, etc.

For the purposes of the present invention, the term "organic fluid" refers to those fluids (other than tetrahydrobenzotriazoles, other triazoles, and tetrahydrobenzotriazole activating solvents) which comprise at least carbon and hydrogen, (e.g., hydrocarbon), but which may comprise other atoms such as oxygen, nitrogen, halogen, etc. These organic fluids may include, for example, one or more of: petroleum, petroleum derivatives and petroleum distillates (e.g., mineral oil, lubricating oils, etc.); animal fats; plant oils; synthetic oils (e.g., polyol esters, alkylated naphthalenes, alkylated benzenes, etc.); hydroprocessed oils; etc., which may function as lubricants, coolants, metal working fluids, anti-wear fluids, anti-friction fluids, etc.

For the purposes of the present invention, the term "metal working fluid" refers to any fluid which is liquid and which may be used in a metal working process for one or more functions, which may include cooling; lubrication, debris removal, reducing or inhibiting corrosion, reducing or inhibiting material build up on workpieces and/or metal working tools, etc. Metal working fluids may also be referred to interchangeably as a "cutting fluid," a "cutting oil," a "cutting compound," etc. The metal working fluid may be aqueous, may be an oil-in-water emulsion, may be a paste, may be a gel, may be a mist, etc. These metal working fluids may include water (for example, in amounts of from 5 to about 70% by weight, such as from about 15 to about 50% by weight of the metal working fluid), conventional coolants and lubricants such as, for example, one or more of: a monocarboxylic acid(s), which may have more than 10 carbon atoms, such as fatty acids having from 12 to 18 carbon atoms; an aromatic or paraffinic carboxylic acid, such as, for example, an alkylsulfuramido carboxylic acid, an arylsulfuramido carboxylic acid, alkenyl dicarboxylic acid, and/or a alkylphenyl carboxylic acid disclosed in, for example, U.S. Pat. No. 4,315,889 (McChesney et al.), issued Feb. 16, 1982, the entire disclosure and contents of which is hereby incorporated by reference; a petroleum distillate(s) (e.g., mineral oil), an animal fat(s), a plant oil(s), etc. The amount of the lubricant/coolant may comprise, for example, from about 1 to about 30% by weight of the metal working fluid.

For the purposes of the present invention, the term "metal working tool" refers to any tool which causes primarily physical changes, as opposed to chemical changes, to a workpiece. Metal working tools may include, for example, drills, drill presses, mills, cutters, planers, lathes, shapers, borers, reamers, grinders, stamping press, scrapers, etc.

For the purposes of the present invention, the term "metal working process" refers to any mechanical process which uses a metal working tool. Such processes may include, for example, drilling, milling, cutting, planing, machining, shaping, stamping, grinding, lathing, trimming, abrading, boring, reaming, polishing, turning, honing, sawing, broaching, tapping, threading etc., or any combination thereof.

For the purposes of the present invention, the term "passivation" refers to the formation of a film which lowers the corrosion rate (e.g., General Corrosion rate) of the metallic surface being treated, usually by continuously or intermittently charging a dose of the film forming material directly into the water of the system to be treated.

For the purposes of the present invention, the term "passivation rate" refers to the time required to form a protective film on a metallic surface.

For the purposes of the present invention, the term "persistency" refers to the length of time a protective film is present on a metal/metal alloy surface when a corrosion inhibitor is not present in the fluid system (e.g., an aqueous system) which is in contact with the protected metal/metal alloy surface.

For the purposes of the present invention, the term "mpy," refers to "milli-inch per year" and is used herein as a unit of measurement of the General Corrosion rate of metal/metal alloy surfaces in the presence of copper or a copper corroding agent such as sodium hypochlorite.

For the purposes of the present invention, the term "General Corrosion" (also called "Uniform Corrosion") refers to corrosion which takes place uniformly over the surface of metal/metal alloy surfaces in the presence of a corrosive agent, thereby causing a uniform removal of metal/metal alloy from the surface and thus a general thinning of the component comprising the metal/metal alloy. General Corrosion should be contrasted with "localized corrosion" such as pitting corrosion, crevice corrosion, etc. General Corrosion rates are measure herein as described in the Measurement of General Corrosion Rates section described below.

For the purposes of the present invention, the amounts referred to herein in terms of weight percent for the tetrahydrobenzotriazoles, other triazoles, tetrahydrobenzotriazole activating solvents, etc., refer to single strength usage amounts where the composition is in a ready to use form. Accordingly, the compositions comprising these tetrahydrobenzotriazoles, other triazoles, tetrahydrobenzotriazole activating solvents, etc., may also be in concentrate form in amounts which provide, after appropriate dilution with, for example, water, organic fluids, etc., single strength usage compositions having the requisite weight percent ranges of tetrahydrobenzotriazoles, other triazoles, tetrahydrobenzotriazole activating solvents, etc., as hereafter specified.

For the purposes of the present invention, the formulas used in the specification, in the claims or in the drawings may represent a single compound, a mixture of compounds, etc., unless otherwise specified.

Description

Copper corrosion issues may occur in various forms. For example, copper corrosion may occur in one of two general forms, one direct and one indirect. In the direct form of copper corrosion, a metal component comprising copper or copper alloy may be chemically attacked by a copper corroding agent such as chlorine, a hypochlorite, etc., which may be used, for example, as an oxidizing biocide in, for example, an industrial water system. Direct chemical attack on the surface of the metal component may cause a general thinning and weakening of the component due to loss of copper metal (i.e., General Corrosion), or may cause localized corrosion (e.g., pitting corrosion, crevice corrosion, etc.) of the metal component. In addition to causing thinning and weakening of the metal component, direct copper corrosion may create an increasingly concentrated copper-containing effluent in any fluid (e.g., water) which comes into contact with the corroding metal component. Disposing of this copper-containing effluent may pose a significant environmental and toxicity problem. Also, the copper-containing effluent may itself catalytically attack organic (e.g., hydrocarbon)-containing materials present in the effluent or in other components in the system, thus causing other undesirable effects.

In the indirect form of copper corrosion, copper ions present in the fluid (e.g., from direct corrosion of metal components) may come into contact with other metal components. These other metal components may comprise metal or metals alloys such as aluminum, steel, iron, etc., which, when contacted with the fluid carrying the copper ions, may cause the copper ion to "plate out" on the surface of the metal component. Because many of such copper ion-containing fluids may also function as electrolytes, the copper that "plates out" on the metal component may then cause an electrochemical process of galvanic corrosion where the aluminum, iron, steel, etc., is electrochemically dissolved from the surface of the metal component to again cause general thinning/weakening (i.e., General Corrosion) of the metal component, as well as localized corrosion (e.g., pitting corrosion, crevice corrosion, etc.) thereof.

Embodiments of the corrosion inhibiting compositions and methods of the present invention are directed at controlling, and especially inhibiting, the corrosive effects of copper due to either direct or indirect corrosion of copper or copper alloys. Tetrahydrobenzotriazoles such as tetrahydrotolyltriazole ("THTT") may be used as corrosion inhibitors for protecting metal/metal alloy components, such as those comprising copper and copper alloys (e.g., brass), from direct corrosion caused by copper corroding agents. These tetrahydrobenzotriazoles may also be used to "scavenge" copper present in the fluids circulating through these systems to minimize, reduce, decrease, etc., indirect galvanic corrosion of metal/metal alloy components (e.g., those comprising aluminum, iron, steel, etc.) caused by the copper in such fluids "plating out." But even when tetrahydrobenzotriazoles are used to protect such metal/metal alloy components in, for example, aqueous systems, the corrosion protection provided by these tetrahydrobenzotriazoles may or may not occur. This variable corrosion inhibiting performance has been found to be due to these tetrahydrobenzotriazoles forming micelles which render these tetrahydrobenzotriazoles "inactive" as corrosion inhibiting agents.

What has been discovered to be surprising with respect to the embodiments of the corrosion inhibiting compositions of the present invention is that the potentially "variable" corrosion inhibiting properties of these tetrahydrobenzotriazoles may be minimized, reduced, lessened, diminished, avoided, prevented, eliminated, etc., by solubilizing these tetrahydrobenzotriazoles in certain tetrahydrobenzotriazole activating solvents, such as propylene glycol, polypropylene glycol, etc. It has been found that solubilizing these tetrahydrobenzotriazoles in these tetrahydrobenzotriazole activating solvents minimizes, reduces, lessens, diminishes, avoids, prevents, eliminates, etc., micelle formation of these tetrahydrobenzotriazole in the presence of, for example, aqueous systems, and thus keeps these tetrahydrobenzotriazoles "active" as corrosion inhibitors for metal components which are corrodible in the presence of copper or copper corroding agents.

Embodiments of the corrosion inhibiting compositions of the present invention comprise: one or more tetrahydrobenzotriazoles (having the general formulas Ia/Ib defined above, including salts of these tetrahydrobenzotriazoles); and one or more tetrahydrobenzotriazole activating solvents. The tetrahydrobenzotriazoles are solubilized in the activating solvents in an amount effective to inhibit corrosion of a metal or metal alloy which is corrodible in the presence of copper or copper corroding agents. For example, embodiments of the corrosion inhibiting compositions may comprise from about 10 to about 90% (e.g., from about 35 to about 70%) by weight of the tetrahydrobenzotriazoles, and from about 10 to about 90% (e.g., from about 30 to about 65%) by weight of the activating solvents.

Embodiments of these corrosion inhibiting compositions may also comprise other triazoles which inhibit corrosion of a metal or metal alloy which is corrodible in the presence of copper or copper corroding agents, such as benzotriazole, tolyltriazole, or a mixture thereof, as well as the respective salts of these other benzotriazoles, in combination with the corrosion inhibiting tetrahydrobenzotriazoles. These combinations may be formulated such that the tetrahydrobenzotriazoles are in a weight ratio to the other triazoles such that the composition decreases the General Corrosion rate, as measured by copper electrodes in the presence of 10 ppm sodium hypochlorite, by at least about 0.05 mpy relative to a corrosion inhibitor component comprising 100% of the other triazoles. For example, the weight ratio of these tetrahydrobenzotriazoles to these other triazoles may be in the range of from about 1:89 to about 1:8, such as from about 1:89 to about 1:12 (e.g., from about 1:44 to about 1:14). See co-pending U.S. application Ser. No. 13/045,638 (to William N. Matulewicz et al.), filed Mar. 11, 2011, the entire disclosure and contents of which is herein incorporated by reference.

Embodiments of the corrosion inhibiting components comprising the one or more tetrahydrobenzotriazoles in combination with the other triazoles may be prepared simply by blending together the constituent compounds or by blending together the precursors of the constituent compounds and then hydrogenating those precursors. Initial hydrogenation of, for example, the methylbenzotriazole isomers may be accomplished by catalytic hydrogenation processes known in the art. See, for example, U.S. Pat. No. 3,597,353 (Randell et al.), issued Aug. 3, 1971; and U.S. Pat. No. 3,849,433 (Butula et al.), issued Nov. 19, 1974, the entire contents and disclosures of which are herein incorporated by reference, for how to prepare tetrahydrobenzotriazoles from the respective benzotriazoles by catalytic hydrogenation, and which may also provide residual unhydrogenated benzotriazoles as the other triazoles for embodiments of compositions of the present invention. Commercially available liquid mixtures of THTT (e.g., a mixture of 4-methyl-1H-benzotriazole and 5-methyl-1H-benzotriazole) may include the trade name product "Cemazol WD-85" available from CEMCO, Inc., the trade name product "COBRATEC 928," available from PMC Specialties Group, Inc., etc.

Embodiments of the corrosion inhibiting compositions of the present invention comprising the one or more tetrahydrobenzotriazoles, optionally other triazoles, and tetrahydrobenzotriazole activating solvents may also comprise other optional ingredients, and/or may be used with such optional ingredients. For example, these optional ingredients may include: water, organic fluids; biocides, fungicides or other bactericidal agents; extreme pressure additives; antioxidants; other corrosion inhibitors besides tetrahydrobenzotriazoles and other triazoles; dyes; water conditioners; pH-controlling agents; perfumes; viscosity-controlling agents; etc.

The embodiments of the compositions of the present invention may be used in a variety of processes, systems, etc., where metal components comprising copper or copper alloy are potentially subject to direct corrosion by being chemically attacked by copper corroding agents, such as for example, chlorine, a hypochlorite, etc., as well as indirect copper corrosion where copper ions present in the fluid may come into contact with metal components comprising metal or metals alloys such as aluminum, steel, iron, etc., on which these copper ions may "plate out" and thus cause galvanic corrosion. These processes, systems, etc., may be aqueous or non-aqueous, and may include, for example, industrial aqueous processes and systems, heat exchanger/transfer systems, metal working processes, machining fluid systems, coolant systems (e.g., cooling water systems), lubricant systems, hydraulic fluid systems, boilers and similar steam generating systems, reverse osmosis processes and systems, oil production processes and systems, flash evaporator processes and systems, desalinization processes and systems, gas scrubber systems, blast furnace systems, paper and pulp processing systems, food and beverage processing systems, bottle washing processes and systems, soil irrigation systems, aqueous-based closed circuit heating or refrigerant systems, polymer coating systems, sewage effluent systems, industrial waste water systems, etc.

In embodiments of the method of the present invention, the corrosion inhibiting composition may be used by directly contacting the metal component (e.g., by treating, applying, forming a film, coating, dipping, spraying, wiping, daubing, etc.) with the composition, or by incorporating, adding, blending, mixing, etc., the composition to a fluid which contacts the metal component. The amount of the corrosion inhibiting composition to be used to provide corrosion inhibition will depend on a variety of factors, including, for example, the particular corrosion inhibition component used and concentration in the composition, the particular process, system, etc., that the corrosion inhibiting composition is used with, the degree of potential corrosion expected in the particular process, system, etc., the manner in which the corrosion inhibiting composition is used, added, incorporated, etc., to inhibit corrosion, etc. For example, providing an amount of the corrosion inhibiting composition which creates a concentration of at least about 1 ppm (such as from about 50 to about 1000 ppm of the composition, e.g., from about 100 to about 500 ppm of the composition, such as from about 250 to about 500 ppm) of the corrosion inhibition component in the fluid circulating in the process, system, etc., may provide effective corrosion inhibition.

Aspects of the embodiments of the corrosion inhibiting compositions of the present invention are illustrated by the graph shown in the FIGURE. The FIGURE represents a continuous line graph, indicated generally as 100, which compares the General Corrosion rates (at 25° C.), as measured by copper electrodes (in mpy) in the presence of two sequentially added aliquots of 5 ppm sodium hypochlorite (total of 10 ppm of sodium hypochlorite added). These copper electrodes (i.e., cathode, anode and reference electrodes) are immersed in each of two solutions (represented by the continuous graphical plots of lines 104 and 108) comprising 2 ppm tetrahydrotolyltriazole (THTT). In solution 104, the THTT is dissolved/dispersed in water as the solvent. In solution 108, the THTT is dissolved/dispersed in propylene glycol as the solvent. After the electrodes have been "passivated" for 60 minutes with each of solutions 104 or 108, the first 5 ppm aliquot of the sodium hypochlorite is added to each solution, as indicated by arrow 112. The second and final aliquot of 5 ppm sodium hypochlorite is added to each of solutions 104 and 108 approximately 15 minutes the first aliquot 112 is added, as indicated by arrow 116-1 (for solution 104) or arrow 116-2 (for solution 108). After 120 minutes from the point at which the electrodes are initially immersed in either solution 104 or 108, the recording of General Corrosion rate data (see Measurement of General Corrosion Rates section below) is terminated, and the recorded data is continuously plotted, as shown by lines 104 and 108 in the FIGURE.

As shown by a comparison of line 108 (solution of 2 ppm THTT in propylene glycol) to line 104 (solution of 2 ppm THTT in water) in graph 100 of the FIGURE, the use of propylene glycol as a solvent for the THTT decreases the General Corrosion rate, as measured by Cu Electrodes in the presence of 10 ppm sodium hypochlorite, relative to water as a solvent. In other words, the solubilizing propylene glycol keeps THTT "active," and thus improves the ability of THTT to act as a corrosion inhibiting agent.

Measurement of General Corrosion Rates

The General Corrosion rates of the corrosion inhibitor compositions/solutions are measured herein as follow:

Equipment Used:
    Pepperl Fuchs Corr Tran MV Unit
    Hart Modem, Model HI-321 (Pepperl Fuchs)
    99.9% Cu Electrodes (CME-OJ) (Pepperl Fuchs)

Corr Tran MV Unit Operating Conditions Used:

| | |
|---|---|
| HDA (Harmonic Distortion Analysis) | PV Units: mpy |
| Electrode Area: 4.75 $cm^2$ | LRV: 0 mpy |
| K Probe Constant: 11685.71 $mm^x cm^2/y/A$ | URV: 40 mpy |
| Measurement Mode: GC + Con | Alarm: Auto |
| Device Mode: Standard | Cyclic/On |
| PV Preference: General | |

Solution/Reagent/Equipment Component Preparation:
1. Corrosive water solutions are prepared according to ASTM D1384-05 Specifications
2. Preparation of Electrodes: Electrodes (i.e., cathode, anode and reference electrodes) used for testing are "conditioned" by using the electrodes a few times and then cleaning electrodes to obtain the most consistent performance. After electrode use, the electrodes are removed from the Corr Tran unit and are cleaned with pumice powder and deionized water until the electrode surface is free of any inhibitor composition or corrosive film. The electrodes are rinsed in HCl (0.1N) for ten seconds, followed by rinsing in deionized water to remove HCl on the surface, and are then polished with clean paper towels. An air hose (oil-free) may be used to remove any liquid from the electrode surface.

3. Preparation of Corrosion Inhibitor Compositions/Solutions: An appropriate quantity of corrosion inhibitor composition/solution is added to 10.000 ml of HPLC grade methanol.

Procedure for Measuring General Corrosion Rates:

The methanol-containing corrosion inhibitor compositions/solutions are added in an amount of 1.005 ml to 1 liter of the prepared corrosive water solution and stirred. After stirring is started, the Cu electrodes (i.e., cathode, anode and reference electrodes) are immersed two inches below the top surface of the corrosive water solution. Corrosion data is then recorded on Corr Tran MV Unit, using the Operating Conditions described above. After immersion ("passivation") in the corrosive water solution for 60 minutes, the first 5 ppm aliquot of sodium hypochlorite (prepared from 6.15% active sodium hypochlorite bleach) to the corrosive water solution. Approximately 15 minutes after the first aliquot is added, a second 5 ppm aliquot of sodium hypochlorite (also prepared from 6.15% active sodium hypochlorite bleach) is added to the corrosive water solution. General Corrosion rate data points are recorded for up to 120 minutes (2 hours) after initial immersion of the Cu Electrodes in the corrosive water solution. The General Corrosion rate data recorded may be used as an individual General Corrosion rate data points or may be graphically plotted continuously (as represented by lines 104 and 108 of graph 100 in the FIGURE).

All documents, patents, journal articles and other materials cited in the present application are hereby incorporated by reference.

Although the present invention has been fully described in conjunction with several embodiments thereof it is to be understood that various changes and modifications may be apparent to those skilled in the art. Such changes and modifications are to be understood as included within the scope of the present invention as defined by the appended claims, unless they depart therefrom.

What is claimed is:

1. A composition comprising: one or more tetrahydrobenzotriazoles having the general formulas Ia or Ib:

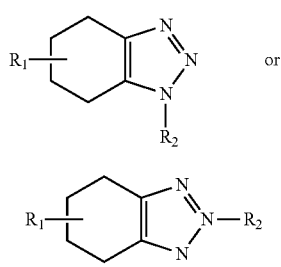

wherein $R_1$ is one or more of: hydrogen, a hydroxy group, or an aliphatic group; and wherein $R_2$ is hydrogen, or an aliphatic group; or a salt of the tetrahydrobenzotriazole; one or more other triazoles having the general formula II:

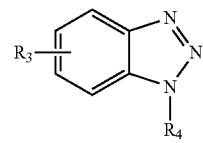

wherein $R_3$ is one or more of: hydrogen, a hydroxy group, aliphatic group, or an aromatic group and wherein $R_4$ is hydrogen, or an aliphatic group; or salts of the other triazoles; and one or more tetrahydrobenzotriazole activating solvents which are one or more of: methanol; ethanol; propanol; isopropanol; butanol; isobutanol; pentanol; isopentanol, hexanol; isohexanol; propylene glycol; ethylene diglycol; diethylene glycol; triethylene glycol; dipropylene glycol; butylene glycol; butyl diethylene glycol; glycerol; methyl, ethyl, propyl and/or butyl monoethers of ethylene glycol, diethylene glycol, propylene glycol, or dipropylene glycol; polyethylene glycol; polypropylene glycol; random-added polypropylene polyethylene glycols; or block copolymers of ethylene and propylene oxide;

wherein the tetrahydrobenzotriazoles are solubilized in the activating solvents in an amount effective to inhibit corrosion of a metal or metal alloy which is corrodible in the presence of copper or copper corroding agents; and wherein the combination of the tetrahydrobenzotriazoles and the activating solvents comprise from about 10 to about 90% by weight of the tetrahydrobenzotriazoles and from about 10 to about 90% by weight of the activating solvents.

2. The composition of claim 1, wherein the one or more tetrahydrobenzotriazoles are one or more of: tetrahydrobenzotriazole; or tetrahydrotolyltriazole.

3. The composition of claim 2, wherein the one or more tetrahydrobenzotriazoles are tetrahydrotolyltriazole.

4. The composition of claim 1, wherein the one or more activating solvents are one or more of: propylene glycol; ethylene diglycol; diethylene glycol; triethylene glycol; dipropylene glycol; butylene glycol; butyl diethylene glycol; glycerol; methyl, ethyl, propyl and/or butyl monoethers of ethylene glycol, diethylene glycol, propylene glycol, or dipropylene glycol; polyethylene glycol, polypropylene glycol, random-added polypropylene polyethylene glycols; or block copolymers of ethylene and propylene oxide.

5. The composition of claim 4, wherein the one or more activating solvents are one or more of: propylene glycol; or polypropylene glycol.

6. The composition of claim 5, wherein the one or more activating solvents are propylene glycol.

7. The composition of claim 1, which comprises from about 35 to about 70% by weight of the tetrahydrobenzotriazoles and from about 30 to about 65% by weight of the activating solvents.

* * * * *